(12) United States Patent
Touati et al.

(10) Patent No.: US 6,453,161 B1
(45) Date of Patent: Sep. 17, 2002

(54) AGILE SERVICE INTERACTION MANAGER FOR INTELLIGENT NETWORK SERVICES

(75) Inventors: Samy Touati, Montreal; Andre Poulin; David Sugirtharaj, both of Laval, all of (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/178,458

(22) Filed: Oct. 23, 1998

(51) Int. Cl.[7] ................................................. H04Q 7/20
(52) U.S. Cl. ....................... 455/433; 455/560; 455/507; 455/422; 455/414; 455/412; 379/207.02; 379/201.01; 379/219
(58) Field of Search ................................ 455/403, 412, 455/414, 422, 433, 435, 461, 507, 550, 552, 426, 560; 379/201.01, 207.02, 242, 229, 219

(56) References Cited

U.S. PATENT DOCUMENTS

| | | | |
|---|---|---|---|
| 5,574,779 A | | 11/1996 | Ely et al. |
| 5,613,213 A | * | 3/1997 | Naddell et al. ............. 455/550 |
| 5,640,677 A | * | 6/1997 | Karlsson ...................... 455/450 |
| 5,644,631 A | | 7/1997 | Sattar et al. |
| 5,915,214 A | * | 6/1999 | Reece et al. ................ 455/432 |
| 6,192,248 B1 | * | 2/2001 | Solondz ........................ 455/450 |

FOREIGN PATENT DOCUMENTS

| | | |
|---|---|---|
| WO | WO 95/04436 | 2/1995 |
| WO | WO 96/38009 | 11/1996 |
| WO | WO 98/21899 | 5/1998 |
| WO | WO 99/38339 | 7/1999 |

OTHER PUBLICATIONS

S. Srinivasan, "Impact of Enhanced Feature Interactions", *IEEE Communications Magazine* Jan. 1995, pp. 100–102.
Zhang, et al.; "Object–Oriented Development for Intelligent Network with Distributed Management"; *IEEE*; Paper submitted to the Global Telecommunications Conferene, 1998.
PCT International Search Report for PCT/SE99/01765; Jul. 26, 2000.

* cited by examiner

*Primary Examiner*—Doris H. To
(74) *Attorney, Agent, or Firm*—Jenkens & Gilchrist (57) ABSTRACT

A method and system for responding to a trigger condition detected during the handling of a call connection in an intelligent network (IN). Upon receipt of an IN trigger, a service interaction manager in a service control point queries a home location register for a subscriber involved in the call connection requesting subscriber subscription information. The service interaction manager also queries a service library associated with the service control point to determine which of an implicated set of services are currently available in the service library and what the properties of those services are. Depending upon which services are available, which services are in the subscriber's subscription list, and the service priority information received from the home location register and the service library, including the properties data from the service library, the service interaction manager reduces the list of implicated services to an applicable set of services and generates a customized execution sequence for the applicable services. Thereafter, at least one of the applicable services is executed in accordance with the customized execution sequence.

27 Claims, 5 Drawing Sheets

AGILE SERVICE INTERACTION MANAGER FOR INTELLIGENT NETWORK SERVICES

BACKGROUND OF THE INVENTION

1. Technical Field of the Invention

The present invention relates to a method and system for prioritizing services execution in a telecommunications switch and in particular for providing customized prioritization of services to be executed in an intelligent network in response to a telecommunications event.

2. Description of Related Art

As stored program-controlled (SPC) switching systems have evolved, a wide variety of useful features have been developed to extend the communication capabilities such systems provide. Such services or features include call forwarding, "800" or toll free services, call screening, and the like. With the development and improvement of sophisticated telecommunications applications, the telecommunications industry has adopted the term "intelligent network" (IN) to denote a concept and architecture for providing vendor-independent and network-independent interfaces between the service logic and the transmission and switching system of a multi-enterprise telecommunications network. The goals of the IN are to centralize the service execution in a control node within a telecommunications network in order to provide rapid definition, testing and introduction of new services as well as the modification of existing services. IN also provides greater flexibility in the design and development of new services in a multi-vendor environment with shorter lead time, and standard network interfaces. The basic concept behind IN is to move the "intelligence" out of each local exchange or Service Switching Point (SSP) and centralize the services providing the intelligence in a Service Control Point (SCP).

During the processing and execution of a call in an IN telecommunications system, including call set-up, call duration, and call termination, the SSP occasionally determines whether certain trigger conditions are met. These trigger conditions, for instance, might include the receipt of an abbreviated dialing code or the receipt of an indication that a called station is currently busy. If no trigger conditions are met, then the SSP proceeds according to normal call processing. Otherwise, if certain trigger conditions are met, the SSP sends a query over a Signaling System No. 7 (SS7) network to the SCP or to a home location register (HLR) requesting instructions on how to proceed with processing of the call.

To handle these requests for instructions, the SCP includes a service interaction manager (SIM) that is programmed to respond to each possible trigger condition by executing certain services according to a particular hierarchy or sequence. Once the services are performed in accordance with the particular services hierarchy, an instruction or set of instructions are sent from the SCP to the SSP informing the SSP on how to proceed. The ongoing call is further processed by the SSP according to these instructions.

Despite efforts to permit more rapid implementation of services through use of the IN, significant portions of the processing software in the SCP must be replaced when adding new services. This is because, in current systems, the SIM is specifically aware of which services are available in a service library of the SCP. In other words, the identity of the available services is hard coded into the SIM. Each time new services are introduced into the service library, the SIM logic must be upgraded so that it is aware of the new services.

In addition, the SIM logic is programmed to execute the applicable services in a fixed sequence in response to a certain trigger condition. Under this system, the hierarchy of services cannot be customized. Moreover, if a new service that is implicated by a certain trigger condition is added, the SIM logic must also be reprogrammed to include a new fixed sequence that includes the new service. The static tightly coupled system formed between the SIM and the service library further prevents the removal of a service from the library (e.g., to perform maintenance or fix a programming defect) without modifying the SIM logic to account for the removed service because the SCP is not programmed to account for a temporary or permanent absence of a service from the library.

Because of these characteristics in current systems, the introduction of new services in an IN network requires an upgrade in the SIM associated with each SCP in the system. Similarly, the removal of a service, even if only temporarily, requires a modification of the SIM logic. Essentially, this means that the addition of new services or the removal of a service requires a corresponding replacement of the SIM. Such replacements are costly in terms of the development time for the SIM logic as well as in terms of the time and effort required to replace the SIM in all of the SCP nodes of the network. The effort and expense associated with these upgrades tends to delay the implementation of new services in IN networks.

There is a need, therefore, for a method and system to help reduce the cost associated with implementing new services and to permit more rapid introduction and implementation of new services in an IN network. There is also a need for a method and system for identifying the currently available services and for customizing the sequence in which the applicable available services are executed in response to a certain trigger point.

SUMMARY OF THE INVENTION

The present invention comprises a dynamic method and system for the generation and execution of a sequence of services in response to a trigger condition in an intelligent network (IN). Upon detection of a trigger condition in a service switching point (SSP), a service interaction manager (SIM) in a service control point (SCP) is notified of the trigger. The SIM determines which services are implicated by the particular trigger condition (i.e., which services might need to be executed in response to the trigger condition). This determination is made by referring to a SIM memory, which contains an overall framework of the allowable service sequences, thereby ensuring that any sequences that can cause problems in the network are not permitted.

The SIM also retrieves subscription information relating to a particular telecommunications subscriber from the subscriber's home location register (HLR). This subscription information may contain certain priority preferences that the subscriber has with respect to the order of service execution for responding to various trigger conditions. In addition, the SIM determines which of the implicated services are currently available in a service library of the SCP by querying the service library. For each of the implicated and available services, a service logic program (SLP) and a set of sequencing data that give context to the service relative to other services, are also retrieved.

By determining which services the subscriber subscribes to and which services are currently available in the service library, the list of implicated services is reduced to an applicable set of services. Then, using the sequencing data from the service library and the priority preferences from the HLR, the applicable services are assembled into a customized sequence for execution. At least one service is then executed in accordance with the adjusted sequence. Next, at least one service is executed in accordance with the customized sequence As a further enhancement, the present invention may compare the customized sequence for service execution with a set of mandatory sequencing rules stored in the SCP. If necessary, the customized sequence can be adjusted to comply with these rules. A message is then sent to the SSP providing instructions for further processing of the call connection.

In accordance with the invention, service modules can be added or removed from the service library without having to modify or replace the SIM logic. The SIM detects the presence or absence of services in the service library and generates the sequence for executing services accordingly. In addition, the service priority data stored in the service library and the HLR can be customized according to a particular subscriber's or network operator's preferences or needs. This preference data, in turn, allows sequences for executing services to be customized. Preferably, in accordance with the invention, the SLP comprises JAVA code or some other interpretive language so as to simplify the dynamic sequencing process and to facilitate reflection (i.e., the ability to discover and process information about the SLP without having to makes changes to the SIM logic).

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
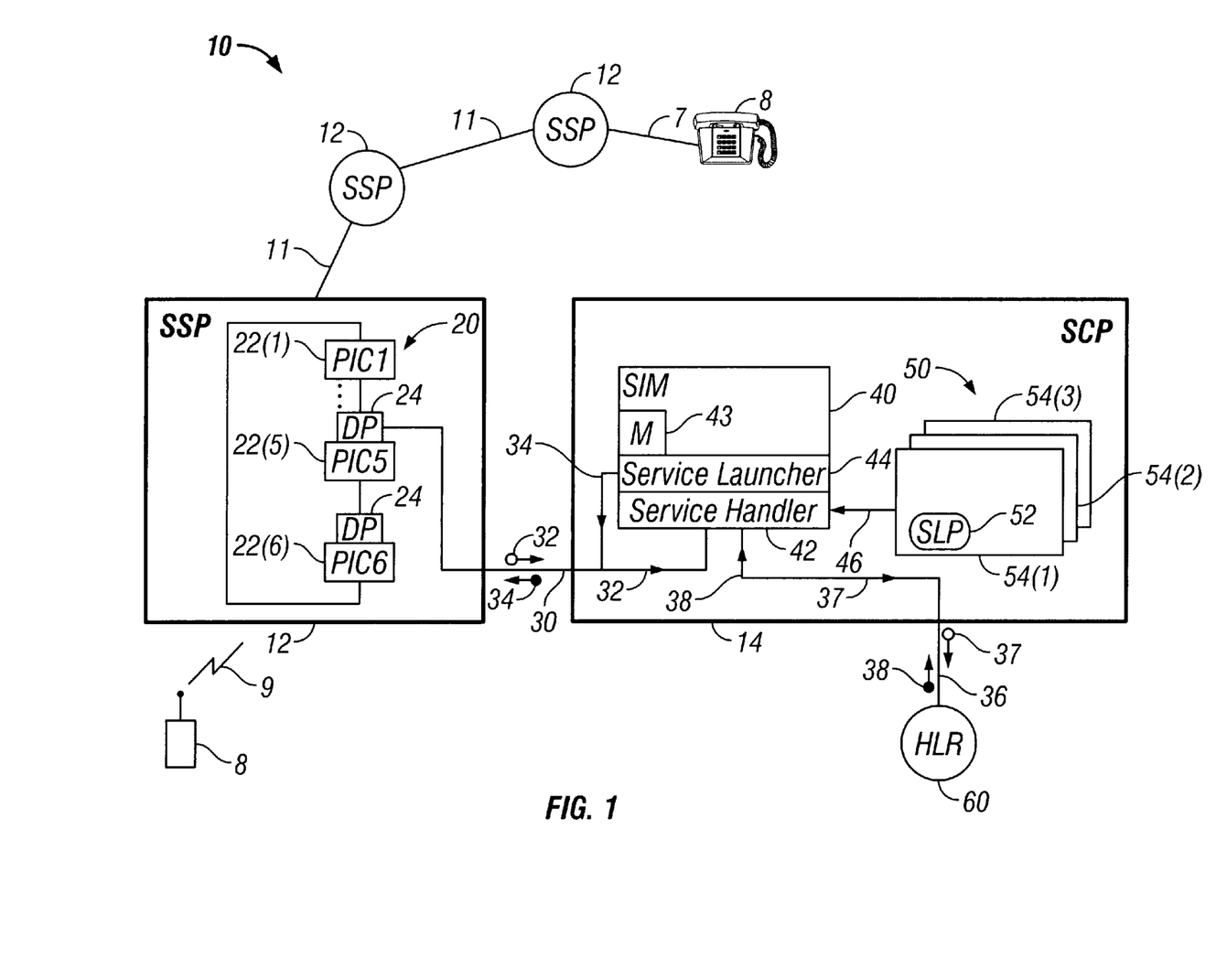
FIG. 1 is a block diagram of a portion of an Intelligent Network (IN) telecommunications system for responding to trigger conditions that occur in the IN system during a call between two subscriber stations.

Reference is now made to FIG. 1, which depicts a portion of an Intelligent Network (IN) telecommunications system 10 and which illustrates the operation of the IN system 10 during a call between two subscriber stations 8. The system 10 includes a Service Switching Point (SSP) 12 and a Service Control Point (SCP) 14 that are primarily responsible for the processing of a call involving a particular subscriber station 8. Typically, the SSP 12 comprises an originating telecommunications switch when the subscriber station 8 is the calling party or a terminating telecommunications switch when the subscriber station 8 is the called party. Communications are transmitted between the subscriber station 8 and the SSP 12 via an air interface 9 in a mobile telecommunications system or via a wireline connection 7 in a wireline telecommunications system. In addition, a series of trunk connections 11 are established through a series of SSPs 12 to connect the originating SSP 12 with the terminating SSP 12 and to permit communications between the two subscriber stations 8. In a mobile telecommunications network, the SSP 12 is preferably included in a platform that comprises a mobile switching center (MSC), while the SCP 14 is part of a separate platform that is coupled to the SSP 12 by a Switching System No. 7 (SS7) link 30.

Calls occurring in an IN are typically represented by a call model (as generally shown at 20). The call model 20 includes a number of possible states that can exist during the set-up, connection, processing, and termination of a call. Each state constitutes a "point in call" (PIC) 22. A call in a typical telecommunications system, for example, might begin at a first PIC 22(1) that defines an idle state, followed at a second PIC (not shown) by a call origination. At a third PIC (not shown), the dialed digits are collected and then analyzed at a fourth PIC (not shown). The call is through-connected at a fifth PIC 22(5) and, finally, is eventually released at a sixth PIC 22(6), at which point the system returns to the idle state of the first PIC 22(1). Although six PICs are discussed here for illustrative purposes, the typical IN call model includes numerous PICs, the approximate number and function of which are defined in the art. The PICs 22 can normally be classified as either a PIC 22 associated with an originating switch for a call or a PIC 22 associated with a terminating switch.

In between the PICs 22 are detection points 24, at which the SSP 12 determines if certain trigger conditions are met. Generally, triggers are related to the occurrence of some event with respect to a particular subscriber station 8. For example, a trigger might be activated upon detection of a call origination request from a subscriber station 8, detection of a request to set up la call connection directed to the subscriber station, or detection in the switch of a request to activate a call forwarding screening list. The SSP 12 contains a list of triggers, and if a trigger is hit during a call involving the subscriber station, the SSP 12 causes a signal 32 to be sent over the SS7 link 30 to the SCP 14 querying the SCP 14 for instructions on how to respond to the trigger condition. The query signal 32 can contain an indication that a specific service is requested or can contain data indicating that several services might be implicated. A request for a specific service is commonly transmitted over the SS7 link 30 as a "service request" (SERREQ) message and normally specifies a single service to be implemented by the SCP 14. The query signal 32 might also include data indicating that multiple services are implicated. For example, in the case of an "origination request" (ORREQ) message for originating a call or an ANALYZE INFORMATION message, that simply requests the analysis of certain information to determine if any action is necessary, the information in the query signal 32 frequently implicates multiple services (i.e., the SCP 14 might need to execute several services to provide proper instructions to the SSP 12).

Although the PICs 22 in the call model 20 are depicted in a loop-type progression, calls do not typically follow a particular sequence of PICs 22. In fact, the PICs 22 that are defined in existing IN systems are not generally arranged in any hierarchical order. Thus, the sequential numbering of the PICs 22 in the Figures and in the above discussion is merely for illustrative purposes and is not intended to indicate a necessary or preferred sequence. Instead, the sequence of the PICs 22 is determined on a call-by-call basis according to which armed triggers are hit during the course of the call and what instructions are returned by the SCP 14 in response to those trigger conditions.

The query signal 32 is received at the SCP 14 by a service interaction manager (SIM) 40, which contains certain software functionalities of the SCP 14. It should be noted that references to the SIM, in the context of this invention, differ from the subscriber identity module, which is also sometimes referred to as a SIM. Initially, a service handler 42 of the SIM 40 receives the query signal 32 and identifies, according to certain stored data, which services from a service library 50 are implicated by the trigger condition indicated by the query signal 32.

In addition to identifying the implicated services, the service handler 42 also determines which services the particular mobile user has subscribed to by accessing the mobile user's subscriber information. A subscriber information request signal 37 is sent to the mobile station's Home Location Register (HLR) 60 via an SS7 link 36, and in response, a subscriber information response signal 38 is received from the HLR 60. The service handler 42 is further programmed to arrange the applicable services (i.e., the implicated services that are subscribed to) in a specific sequence corresponding to the particular trigger condition that was detected. Thus, the service handler 42 knows which services are available in the service library 50 and is able to determine which of the available services are subscribed to by the mobile user. Furthermore, the service handler 42 knows which of the available, subscribed-to services are implicated by each possible trigger condition and knows the sequence of service execution for each trigger condition.

The service library 50 contained in the SCP 14 constitutes a plurality of service modules 54(1), 54(2), and 54(3). Each service module 54 includes a Service Logic Program (SLP) 52 that contains instructions for implementing that respective service. After the service handler 42 receives the query signal 32, the SLPs 52 for the applicable services are retrieved from the service library 50 (as indicated at 46) and are executed by the service launcher 44 in accordance with the fixed sequence of services. Based on the outcome of the execution of the services, a response signal 34 is sent back to the SSP 12 via the SS7 link 30. The response signal 34 contains an instruction or set of instructions directing the SSP 12 on how to proceed with the ongoing call.

Figure 2:
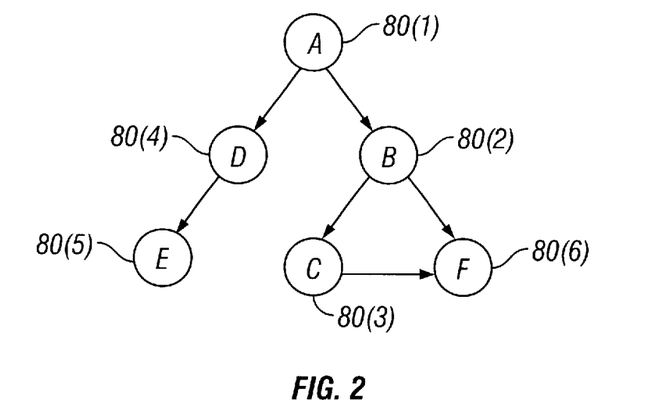
FIG. 2 is a sequence diagram illustrating an exemplary sequence, as can be programmed into the service handler of a service interaction manager, defining the execution of services in response to a specific trigger condition.

Reference is now made to FIGS. 1 and 2, wherein FIG. 2 illustrates an exemplary sequence, as programmed into the service handler 42, for the execution of services in response to a specific trigger condition. After receiving a query signal 32 indicating a particular trigger condition, the service handler 42 determines that a specific sequence of services associated with that trigger condition should be initiated, beginning with a service A 80(1). The service handler 42 retrieves that specific, sequence from a memory 43 within the SIM 40. The service handler 42 then retrieves the SLP 52 for the service A 80(1) and for each of the other services in the sequence. The service handler 42 arranges the retrieved services according to the programmed sequence and forwards the SLPs 52 for each of the applicable services to the service launcher 44 for execution. The services are then initiated by the service launcher 44 according to the programmed sequence.

In the illustrated example, service A 80(1) is followed by either a service D 80(4) or a service B 80(2), depending upon the outcome of the execution of the service A 80(1). If the service D 80(4) is the appropriate service, then the service D 80(4) is executed by the service launcher 44 followed by a service E 80(5). If the service B 80(2) is the appropriate service, on the other hand, the service B 80(2) is the next service to be executed by the service launcher 44. Again, depending upon the outcome of the execution of the service B 80(2), the service B 80(2) is followed by services C and F 80(3) and 80(6) in sequence or by the service F 80(6) alone, according to the programmed sequence. In many cases, the programmed sequence is in the form of a tree arrangement, as illustrated in this example, wherein the execution of at least some of the subsequent services is dependent upon the outcome of certain previously executed services, rather than in a strict sequential order, and wherein typically not all of the services in the sequence are used during execution of the sequence.

Figure 3:
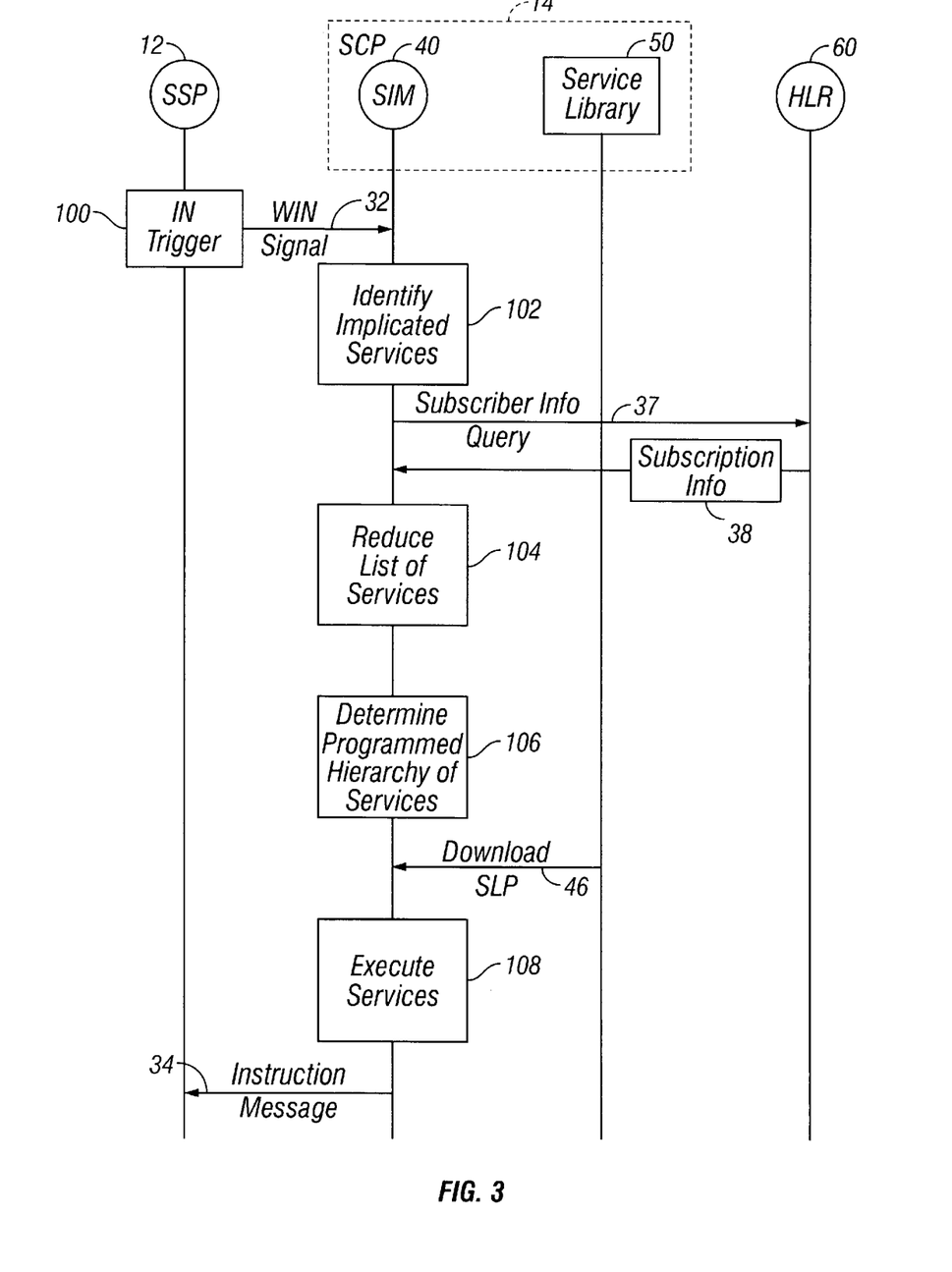
FIG. 3 is a message flow and network operation diagram illustrating the execution of a sequence of services in response to a trigger condition in a wireless intelligent network (WIN)

Referring now to FIG. 3, there is shown a message flow and network operation diagram illustrating the execution of a sequence of services in response to a trigger condition in a wireless intelligent network (WIN). At a first step 100, an IN trigger is detected in the SSP 12. As a result, a WIN query signal 32 is sent to the SIM 40 in the associated SCP 14. The SIM 40 examines the information contained in the WIN signal 32, including an identification of the detected trigger condition, to identify a set of implicated services at step 102. If the SCP 14 has not previously obtained subscriber information for the particular mobile user (i.e., in response to an earlier registration signal), then a subscriber information query 37 is sent to the subscriber's HLR 60.

The HLR 60 (or the VLR, if applicable) retrieves the subscriber data and sends this data in a return signal 38 to the SCP 14. Generally, the subscriber data includes information identifying all of the services to which the mobile user subscribes; in other words, the data in the return signal 38 is not limited to subscription data relating only to the implicated services. The SIM 40 examines the information in the return signal 38 to determine which of the implicated services are subscribed to and reduces the list of services to be implemented accordingly at step 104 (i.e., services that are implicated by the original WIN signal 32 but that the mobile user does not subscribe to will not be implemented). Based on the particular trigger condition identified in the WIN signal 32 and the services identified in the reduced list of services, an appropriate programmed sequence or hierarchy for executing the services is determined at step 106. The appropriate SLPs 52, corresponding to the applicable services, are downloaded from the service library 50 to the SIM 40 (as indicated at 46), and the services are executed in the appropriate sequence by the SIM 40 at step 108. Finally, an instruction message 34 in accordance with the outcome of the service execution is sent from the SCP 14 to the SSP 12 instructing the SSP 12 on how to proceed with the call processing.

Figure 4:
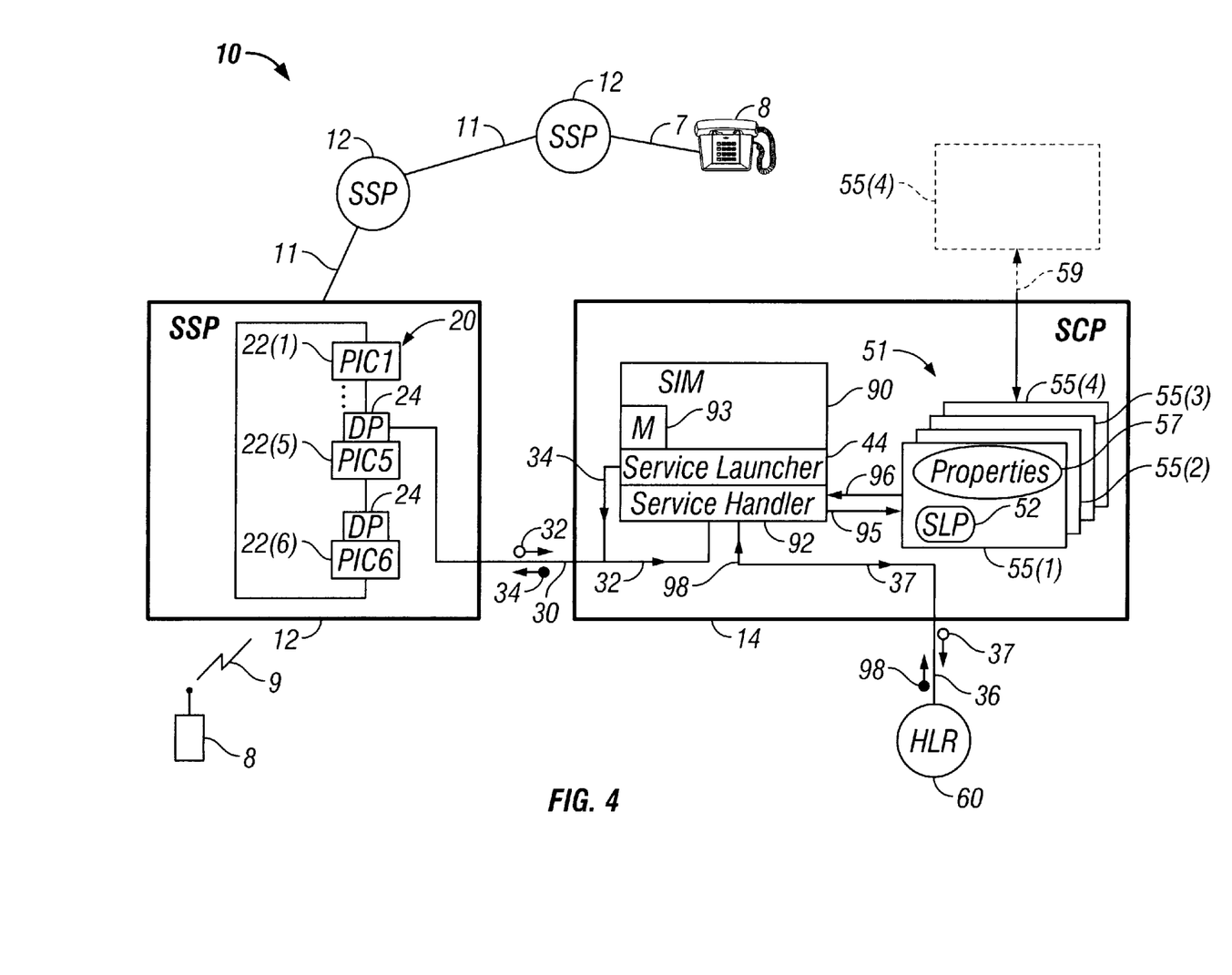
FIG. 4 is a block diagram of a portion of an Intelligent Network (IN) telecommunications system for responding, in accordance with the present invention, to trigger conditions that occur in the IN system.

Reference is now made to FIG. 4, which depicts a portion of an Intelligent Network (IN) telecommunications system 10 and which illustrates the operation of the IN system 10 in accordance with the present invention. As in FIG. 1, when an event occurs during the course of a call that causes a trigger to be hit (i.e., at a detection point 24), a query message 32 is sent via SS7 link 30 to the SCP 14. The query message 32 is received by a service handler 92 of the SIM 90. Unlike the SIM 42 of FIG. 1, however, the SIM 90 illustrated in FIG. 4 is not programmed to know which services are available in the service library 51. Instead, the SIM 90 is capable of querying the service library 51 to determine which services are currently available. As an additional distinction from the service handler 42 of FIG. 1, the service handler 92 of FIG. 4 does not include a programmed sequence. Rather, the service handler 92 is capable of constructing a customized sequence depending upon which services are available and with reference to sequence preference data stored in the HLR 60 and in the service library 51.

After the SCP 14 receives the query message 32 and sends a subscriber information request signal 37 to the HLR 60, the HLR 60 returns a subscriber information response signal 98. In addition to containing subscription information, as in the response signal 38 of FIG. 1, the response signal 98 also includes sequence preference data for the subscriber. The sequence preference data indicates the subscriber's preferences for prioritizing the implementation of sequences, either in general or in response to a particular type of trigger.

The SIM 90 includes a memory 93 containing a list of the implicated services, wherein each entry in the list corresponds to a possible trigger condition; thus, the SIM 90 is aware of which services are implicated by a particular trigger condition. As indicated above, however, the SIM 90 is not programmed to know which services are currently available in the service library 51. Therefore, the SIM 90 also sends an available services query message 95 to the service library 51 requesting information on the availability and properties of the implicated services.

The service library contains a plurality of service modules 55(1), 55(2), 55(3) and 55(4), each comprising an SLP 52 and certain Service Module Properties data 57. The Service Module Properties data 57 contains sequence preferences that are selected and/or programmed into the service module 55 by the service provider or network operator. In response to the available services query message 95, a response message 96 is sent from the service library 51 to the service handler 92 indicating which services are available in the service library 51 and providing an SLP 52 for each available service or, alternatively, for each available service that is also subscribed to by the subscriber. In addition, the data from the Service Module Properties 57 is also downloaded from the service library 51 to the service handler 92 (as indicated at 96) in response to the query message 95.

After receiving the subscription information from the HLR 60 and the available services data from the service library 51, the service handler 92 determines the appropriate customized sequence for executing the services based on which services are available and subscribed to and on the sequence preference data from the HLR 60 and the Service Module Properties 57.

The sequence preference data is used to arrange services in a preferred sequence and can include exclusion lists, execute-before lists, execute-after lists, or some other indication of relative priority. For instance, by placing a particular exclusion in voice mail, the activation of call waiting can be prevented (i.e., calls are automatically forwarded to voice mail). An execute-before priority, on the other hand, can be used when it is desirable to execute one service before another. For example, a particular subscriber might subscribe to both an abbreviated dialing service, wherein a four digit code entered by the user is translated into a ten digit directory number, and a call screening service, which might prevent incoming call waiting interruptions when a certain directory is dialed. In such a scenario, it might be desirable to have an execute-before priority associated with the abbreviated dialing service with respect to the call screening service, so that abbreviated dialing is always executed before call screening. Furthermore, the priority data can constitute either an optional priority preference or a mandatory priority rule. For example, the subscriber's sequence preference data might include a certain (optional) priority preference that happens to be barred by the operator according to a rule stored in the Service Module Properties 57 because such a priority tends to cause problems in the network. In this type of case, the portion of the subscriber's priority preference data that is barred by the operator will be overruled by the Service Module Properties 57. In other cases, however, the Service Module Properties 57 might contain certain optional preferences that can be overridden by the subscriber's preferences.

In generating the customized sequence, the service handler 92 can either compile the SLPs 52 into a desired hierarchical arrangement, or can simply generate sequencing instructions for execution of the applicable SLPs 52. Then, the SLP data for the applicable services (i.e., in either a compiled format or as individual sets of code) is forwarded to the service launcher 44. The services are executed by the service launcher 44 according to the customized sequence, and an instruction message 34 is returned to the SSP 12 based on the outcome of the executed services.

One benefit of the invention is that sequence data can be stored either with the Service Module Properties 57 of the service module 55 and/or with the subscriber data in the HLR 60. As a result, the SIM does not have to know the behavior of, and the various properties of, an entire library of services. Instead, the service modules 55 and/or the subscriber data in the HLR 60, know their own exclusions, before-lists, and after-lists.

Additionally, the SIM 90 does not have to know which services are available in the service library 51. This feature permits a service module 55(4) to be removed from the service library for maintenance purposes (as generally indicated at 59), for example, without having to completely disable the SIM 90. Furthermore, this feature allows new service modules 55(4) to be added (as generally indicated at 59) to the service library 51 without having to replace or modify the SIM 90. This is because the SIM 90 is capable of discovering what service modules 55 are currently in the service library 51 and of prioritizing services based on which services are currently available.

Also in accordance with the invention, new SIMs 90 can be installed in the SCP 14 on a relatively infrequent basis (e.g., annually or biannually), instead of having to install a new SIM 40 each time a service is added or removed. At the time the SIM 90 is installed, for instance the service library 51 might contain only five services. However, there might be plans to add five new services within the next year. Each of the planned services can be included in the implicated services lists (i.e., in the SIM memory 93) for each applicable trigger condition. In addition, while it is preferable to use names in the implicated services lists that have some meaning with respect to the corresponding service, it is also possible to include "placeholder" names in the implicated services lists that do not refer to a specific planned service, thereby allowing compatibility with future services, even for services that are not yet contemplated.

Before a particular service is incorporated in the service library 51, the service handler 92 is able to determine that the service is not in the service library 51 and is able to generate customized sequences that do not include the missing service. Once the service module 55 is installed (as generally indicated at 59), however, the SIM 92 is able to detect the availability of the service land to include the service in subsequent customized sequences. In this situation, a sequence generated after a new service is installed might be significantly different from a sequence generated before the service is installed even though the two sequences are generated in response to the same trigger condition. This potential difference illustrates the dynamic aspect of the invention that results from the ability to customize the sequencing of services depending on which services apply.

Another possible beneficial use of the invention is that the SIM 92 does not have to be customized for each network operator based on the specific set of services offered by each operator. Thus, a particular SIM 92 can be designed, for example, to accommodate ten particular services, while an operator of a specific telecommunications network might choose to provide only five of the ten available services. By permitting the SIM 92 to discover which services are available in the service library 51, the SIM 92 can be used, without modification, to support the five offered services and to support the not currently offered services in the future without requiring any subsequent SIM update.

Figure 5A:
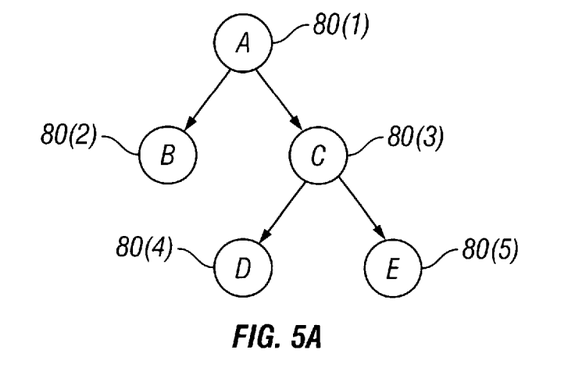
FIG. 5A is a sequence diagram illustrating one example of a customized service execution sequence that might be generated, in accordance with the present invention, by the service handler of a service interaction manager in response to a specific trigger condition.
Figure 5B:
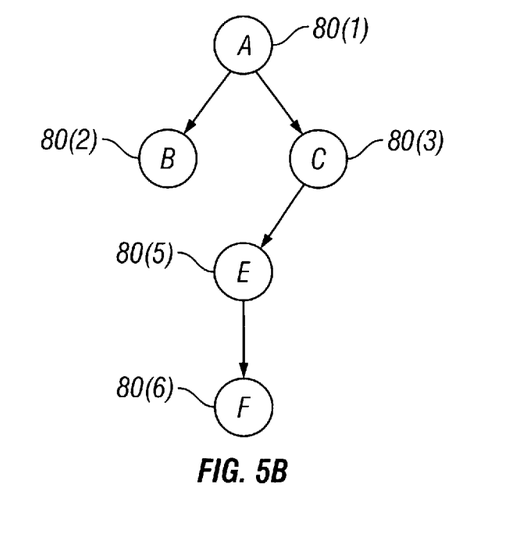
FIG. 5B is a sequence diagram illustrating a second example of a customized service execution sequence that might be generated by the service handler of a service interaction manager for the execution of services in response to a specific trigger condition.

As discussed in greater detail above, after receiving the query signal 32 indicating the specific trigger condition, the service handler 92 requests and receives subscriber priority preference data from the HLR 60 and requests and downloads sequencing data from the service library 51. The service handler 92 then constructs a customized sequence for the execution of services. In FIGS. 5A–5B, there are illustrated two different examples of customized sequences that might be generated by the service handler 92 for the execution of services in response to a specific trigger condition. The two sequences are similar in that they begin with service 80(1). Depending on the outcome of service A 80(1), either a service B 80(2) or a service C 80(3) is then executed. These two examples differ, however, because after the execution of the service C 80(3) in FIG. 5A, either a service D 80(4) or service E 80(5) is executed depending on the outcome of the service C 80(3). In the exemplary sequence of FIG. 5B, on the other hand, the service C 80(3) is followed in succession by the service E 80(5) and a service F 80(6).

A difference between two customized sequences constructed in accordance with the present invention, such as those in FIGS. 5A–5B, can be the result of one or more of a variety of factors. The difference can be caused, for instance, by differences between the subscriber priority data for two subscribers or by differences between the Service Module Properties 57 used by two different operators. Another possibility is that the difference is caused by one sequence being associated with a first subscriber who subscribes to a first set of services while the other sequence is associated with a second subscriber who subscribes to a second, different, set of services. Furthermore, the sequence of FIG. 5A might be the result before a particular service (e.g., the service F 80(6)) is added to the service library 51, while the sequence of FIG. 5B results after the particular service is added. The cause of the difference might be that the two sequences are generated by two SIMs 90 that have differing implicated service lists.

Figure 6:
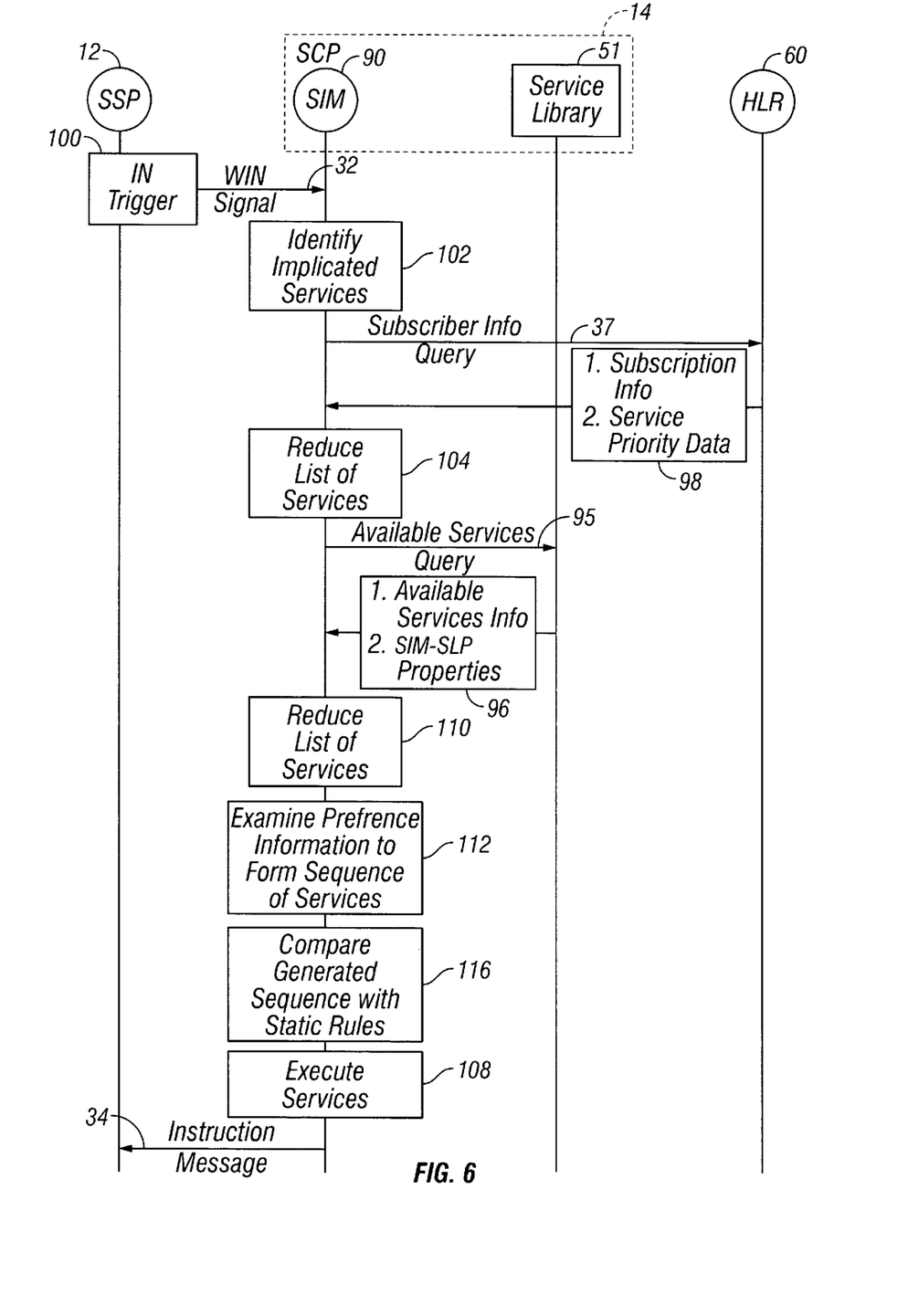
FIG. 6 is a message flow and network operation diagram illustrating the execution, in accordance with the present invention, of a sequence of services in response to a trigger condition in a wireless intelligent network (WIN).

Reference is now made to FIG. 6, wherein there is shown a message flow and network operation diagram illustrating the execution, in accordance with the present invention, of a sequence of services in response to a trigger condition in a wireless intelligent network (WIN). At a first step 100, an IN trigger is detected in the SSP 12. As a result, a WIN query signal 32 is sent to the SIM 90 in the associated SCP 14. The query signal 32 includes data identifying the particular trigger condition and an identification of the mobile user associated with the trigger condition. The SIM 90 examines the information contained in the query signal 32 to identify a set of implicated services at step 102. This identification of implicated services can be accomplished, for example, by matching the particular trigger condition identified in the query signal 32 with a corresponding list of implicated services stored in the SIM 90. Next, a subscriber information query 37 is sent to the subscriber's HLR 60.

The HLR 60 retrieves the subscriber data and sends this data in a return signal 98 to the SCP 14. The return signal 98 includes two pieces of information relevant to the present invention: (1) information identifying all of the services to which the mobile user subscribes; and (2) information identifying the mobile user's service priority preferences. The SIM 90 examines the information in the return signal 98 to determine which of the implicated services are subscribed to and reduces the list of services to be implemented accordingly at step 104 (i.e., services that are implicated by the original WIN signal 32 but that the mobile user does not subscribe to will not be implemented).

The SIM 90 also sends an available services query 95 to the service library 51 requesting information about the implicated, subscribed-to services. In response, the service library 51 sends a response signal 96 to the SIM 90. The response signal 96 includes data from the SLP 52 of each service and also includes service priority data from the Service Module Properties 57 node of each service. As discussed above, the list of implicated services can include services that are not currently in the service library 51. Thus, the SIM 90 examines the information in the response signal 96 to determine which of the implicated services are currently available in the service library 51, reducing the list of services to be implemented accordingly at step 110. Although FIG. 6 depicts sending the query signal 37 to the HLR 60 before sending the available services query 95 to the service library 51, the order in which the signals 37 and 95 are transmitted is not particularly important. The two signals 37 and 95 can be sent in the opposite order from what is depicted or can be sent simultaneously. It will be appreciated, however, that if the mobile user's service subscriptions are identified before the SIM 90 requests a download of information from the service library 51, the number of SLPs 52 requested from the service library 51 might be reduced (i.e., if the mobile user does not subscribe to all of the implicated services).

Next, at step 112, the SCP 14 examines the priority preference information from the HLR 60 and/or from the Service Module Properties 57 of each service module 55 to construct a customized sequence. Optionally, this customized sequence can be compared with a set of static rules that govern the sequential execution of services at step 116 (e.g., the rules might specify that some services can never be executed after others because, otherwise, an endless service loop might occur). These static rules can be stored either in the SIM memory 93 (see FIG. 4) or can simply be incorporated into the Service Module Properties 57 in the service modules 55. Once the customized sequence is adjusted, if necessary, to conform to the static rules, the services are executed in the customized sequence at step 108, and an instruction message 34 is transmitted from the SCP 14 to the SSP 12, instructing the SSP 12 on how to proceed.

In a preferred embodiment, the SLPs 52 include code that is written in the JAVA language or in some other type of interpretive language supporting dynamic loading and reflection. Use of such a language simplifies the dynamic aspects of the invention because the SIM 90 can easily determine which services are currently available and because the JAVA code can be easily downloaded to and executed by the SIM 90 without having to design specific detailed instruction code for the SIM 90 platform itself. The invention can also use JAVA code for the Service Module Properties 57 and for the subscriber preference data to further simplify the dynamic sequencing of services.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for generating a prioritized sequence of services to be executed for a particular telecommunications subscriber station in a telecommunications node, comprising the steps of:
    detecting a telecommunications event involving said subscriber station;
    identifying a plurality of services implicated by said event;
    identifying an available set of services by determining which of said plurality of services are currently available for execution;
    arranging said available set of services into a prioritized sequence depending on which services are included in the available set of services; and
    executing at least one of said available set of services in accordance with said prioritized sequence.

2. The method of claim 1 wherein said telecommunications event includes a detection of a call origination request transmitted by the subscriber station.

3. The method of claim 1 wherein said telecommunications event includes a detection of a request to set up a call connection with the subscriber station.

4. The method of claim 1 wherein said step of identifying an available set of services further comprises the step of querying a library of services to determine which of said plurality of services are currently present in the library.

5. The method of claim 1 further comprising the steps of:
    querying a home location register (HLR) for subscriber-specific information relating to the subscriber station; and
    receiving from the HLR said subscriber-specific information; and
    generating a prioritized sequence in accordance with the received subscriber-specific information.

6. The method of claim 5 wherein the subscriber-specific specific information includes an identification of services that are subscribed to by the subscriber station.

7. The method of claim 5 wherein the subscriber-specific information includes service prioritization information.

8. The method of claim 1 further comprising the steps of:
    retrieving system operator-specified service prioritization information; and
    generating a prioritized sequence in accordance with the retrieved operator-specified prioritization information.

9. The method of claim 8 further comprising the steps of:
    comparing the prioritized sequence, generated in accordance with the retrieved prioritization information, with a set of static priority rules; and
    rearranging the prioritized sequence to comply with the static priority rules.

10. The method of claim 1 further comprising the steps of:
    retrieving a set of logic instructions for each of the services to be executed during the step of executing; and
    using said logic instructions for performing said step of executing.

11. The method of claim 1 further comprising the steps of:
    querying a home location register (HLR) for subscriber-specific information relating to the subscriber station;
    receiving from the HLR said subscriber-specific information, wherein said subscriber-specific information includes service prioritization data;
    querying a library of services to determine which of said plurality of services are currently present in the library;
    receiving available service information from the library, wherein said available service information includes service prioritization data; and
    wherein said step of arranging the available set of services into the prioritized sequence is further dependent upon the service prioritization data included in the available service information received from the library and the subscriber-specific information received from the HLR.

12. A telecommunications system, comprising:
    a switch for routing calls within the telecommunications system, said switch operating to detect a trigger condition relating to a subscriber station;
    a service library for storing at least one service module, each said service module containing instructions for executing a specific telecommunications service; and
    a telecommunications node linked to the switch and to the service library, wherein said telecommunications node operates to:
        receive a trigger signal from the switch, said trigger signal generated by the switch in response to the detection of the trigger condition and wherein the trigger signal identifies the trigger condition;
        identify a plurality of services implicated by the trigger condition;
        determine an available set of services from the plurality of services that are currently available in the service library; and
        arrange the available set of services into a prioritized sequence for execution.

13. The telecommunications system of claim 12, wherein the telecommunications node further operates to execute at least one service in the available set of services according to the prioritized sequence.

14. The telecommunications system of claim 13, wherein the telecommunications node sends a return signal to the switch after executing the at least one service in the available set of services, said return signal including instructions for responding to the trigger condition.

15. The telecommunications system of claim 12, wherein the service library further stores service prioritization data for at least one service in the library.

16. The telecommunications system of claim 15, wherein the available set of services are arranged into the prioritized sequence based, at least in part, on service, prioritization data stored in the service library.

17. The telecommunications system of claim 15, wherein the telecommunications node further operates to receive subscriber-specific data from a home location register (HLR) associated with the subscriber station, said subscriber-specific data indicating which services containing subscription information for the subscriber station and containing service prioritization data for the subscriber station.

18. The telecommunications system of claim 17, wherein the available set of services includes only services that are listed in the subscription information received from the HLR.

19. The telecommunications system of claim 18, wherein the available set of services are arranged into the prioritized sequence based, at least in part, on service prioritization data stored in the service library and on service prioritization data contained in the subscriber-specific data.

20. A service control point in an intelligent network of a telecommunications system, comprising:
- a service library for storing at least one service logic program, each service logic program for executing a telecommunications service; and
- a service interaction manager for generating a service execution sequence in response to a detection of a trigger condition within the intelligent network, the service interaction manager operating to:
  - identify a plurality of services implicated by the trigger condition;
  - retrieve subscriber information stored in a home location register (HLR) for a particular subscriber to the telecommunications system, said subscriber associated with said HLR, wherein the subscriber information identifies the subscriber's subscribed-to services;
  - determine an available set of services from said implicated plurality of services by identifying which services are available in the service library;
  - retrieve, from the service library, the service logic program for each service of an applicable set of services, wherein the applicable set of services includes each service that is both one of the services in the available set of services and is identified with subscriber information; and
  - generate said execution sequence by arranging the applicable set of services into a prioritized sequence based, at least in part, on certain properties associated with said applicable set of services.

21. The service control point of claim 20 wherein each service logic program comprises a code written in an interpreted language to support dynamic loading and reflection.

22. The service control point of claim 20 further comprising a memory for storing data correlating at least one trigger condition with a plurality of implicated services.

23. The service control point of claim 20 wherein said certain properties include service priority information stored in the service library, the service interaction manager retrieving the service priority information and using the service priority information for generating the execution sequence.

24. The service control point of claim 23 wherein the subscriber information identifies at least one service priority preference for the subscriber.

25. The service control point of claim 24 wherein said certain properties further include the at least one service priority preference and the service interaction manager further uses the at least one service priority preference for generating the execution sequence.

26. The service control point of claim 25 wherein the service interaction manager further executes, in accordance with the execution sequence, at least one service from the applicable set of services.

27. The service control point of claim 26 wherein the service interaction manager further sends an instruction message, following the execution of the execution sequence, to a service switching point associated with the service control point in the telecommunications network.

* * * * *